United States Patent
Lovicott et al.

(10) Patent No.: US 10,331,189 B2
(45) Date of Patent: Jun. 25, 2019

(54) FAN SPEED DETERMINATION FOR IMPROVED POWER MANAGEMENT IN INFORMATION HANDLING SYSTEMS

(71) Applicant: Dell Products L.P., Round Rock, TX (US)

(72) Inventors: Dominick A. Lovicott, Round Rock, TX (US); John Erven Jenne, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 373 days.

(21) Appl. No.: 14/621,146

(22) Filed: Feb. 12, 2015

(65) Prior Publication Data
US 2016/0239067 A1    Aug. 18, 2016

(51) Int. Cl.
| | | |
|---|---|---|
| G06F 1/32 | (2019.01) | |
| G06F 1/3206 | (2019.01) | |
| G06F 1/20 | (2006.01) | |
| G06F 1/3203 | (2019.01) | |

(52) U.S. Cl.
CPC ............ *G06F 1/3206* (2013.01); *G06F 1/206* (2013.01); *G06F 1/3203* (2013.01); *Y02D 10/16* (2018.01)

(58) Field of Classification Search
CPC .................................................. G06F 1/3206
USPC ........................................................ 713/300
See application file for complete search history.

(56) References Cited

U.S. PATENT DOCUMENTS

| | | | |
|---|---|---|---|
| 5,249,741 A * | 10/1993 | Bistline | G05D 23/1906 165/80.3 |
| 8,482,235 B2 | 7/2013 | Gutmann et al. | |
| 2006/0074585 A1* | 4/2006 | Reinberg | G01K 7/425 702/130 |
| 2006/0101289 A1* | 5/2006 | Dang | G06F 1/206 713/300 |
| 2010/0211804 A1* | 8/2010 | Brumley | G06F 1/206 713/300 |
| 2012/0204715 A1* | 8/2012 | Hagan | B01D 46/46 95/26 |
| 2013/0258582 A1* | 10/2013 | Shelnutt | G06F 1/206 361/679.48 |
| 2014/0067139 A1 | 3/2014 | Berke et al. | |
| 2014/0108831 A1 | 4/2014 | Dube et al. | |
| 2014/0154049 A1* | 6/2014 | Huang | H05K 7/20209 415/1 |
| 2014/0281609 A1* | 9/2014 | Hanumaiah | G06F 1/206 713/320 |

* cited by examiner

*Primary Examiner* — Jaweed A Abbaszadeh
*Assistant Examiner* — Sumil M Desai
(74) *Attorney, Agent, or Firm* — Baker Botts L.L.P.

(57) ABSTRACT

A baseboard management control subsystem may determine a fan speed value associated with a fan speed used to cool a particular hardware configuration of an information handling system. The baseboard management control subsystem may further determine a power value associated with a power consumed by a fan running at the determined fan speed value. The baseboard management system may manage power within the information handling system based on the determined fan speed value and the determined power value.

20 Claims, 5 Drawing Sheets

| QUANTITY | COMPONENT |
|---|---|
| 2 | CPUs |
| 8 | MEMORY DIMMs |
| 2 | HARD DISK DRIVES |
| 0 | 10W PCIe CARDS |
| 2 | 25W PCIe CARDS |
| 1 | 75W PCIe CARDS |

INVENTORY INFORMATION — 500

FIG. 5A

| COMPONENT | POWER (W) | FAN SPEED (%) |
|---|---|---|
| CPU | 92 | 18 |
| MEMORY DIMM | 4 | 1 |
| HARD DISK DRIVE | 8 | 2 |
| 10W PCIe CARD | 9 | 2 |
| 25W PCIe CARD | 21 | 4 |
| 75W PCIe CARD | 66 | 16 |

POWER PARAMETER LUT — 510

FIG. 5B

| COMPONENT UPGRADE | POWER (W) | FAN SPEED (%) |
|---|---|---|
| ADDITIONAL CPU | 92 | 18 |
| MEMORY HALF-LOADED | 12 | 3 |
| MEMORY FULLY-LOADED | 24 | 6 |
| STORAGE HALF-LOADED | 16 | 4 |
| STORAGE FULLY-LOADED | 32 | 8 |
| 10W PCIe CARD | 9 | 2 |
| 25W PCIe CARD | 15 | 4 |
| 75W PCIe CARD | 21 | 4 |

POWER PARAMETER LUT — 520

FIG. 5C

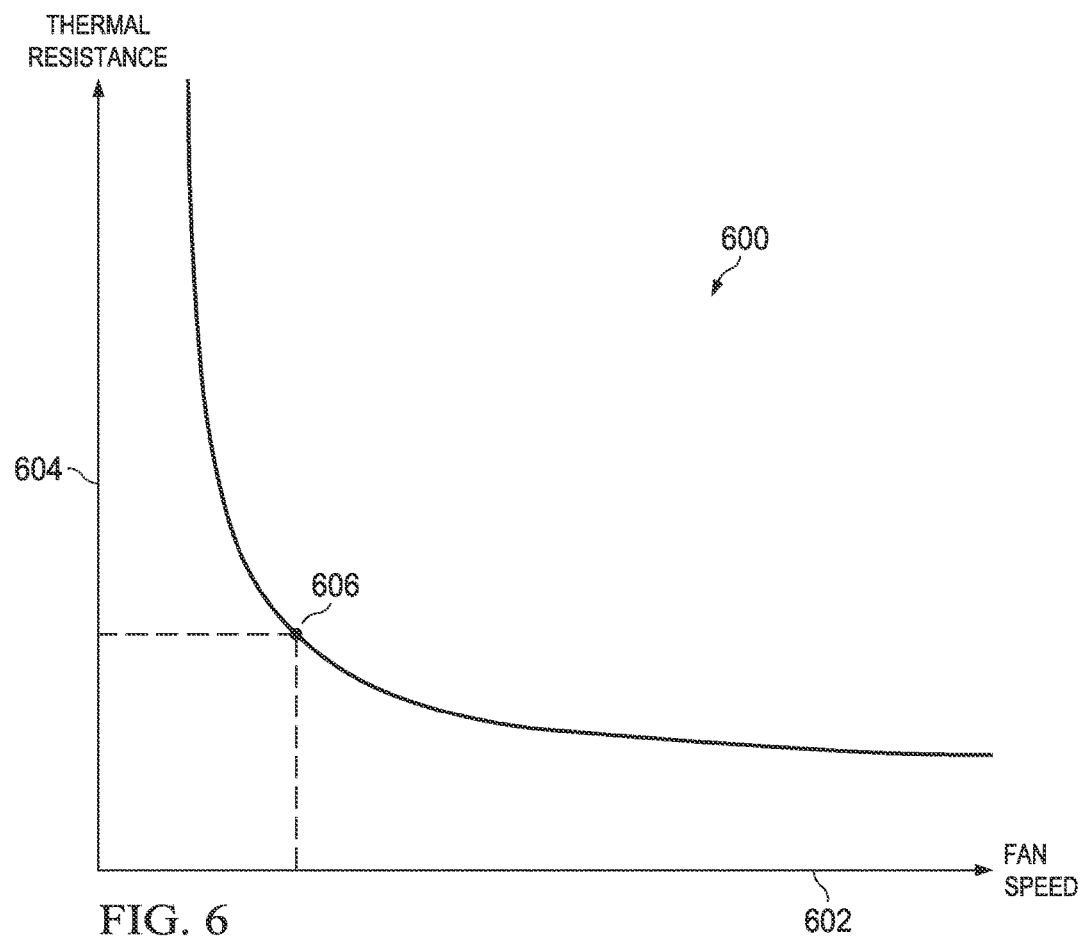

FAN SPEED DETERMINATION FOR IMPROVED POWER MANAGEMENT IN INFORMATION HANDLING SYSTEMS

BACKGROUND

Field of the Disclosure

This disclosure relates generally to information handling systems and more particularly to determining fan speed values associate with cooling particular hardware configurations of information handling systems for improved power management.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may process, store, and communicate information and may include one or more computer systems, data storage systems, and networking systems.

In various information handling systems, power consumed by components within the information handling systems may be cooled by airflow generated by fans associated with the information handling systems. As the fans facilitate cooling the information handling systems and their components, the fans too may consume power.

SUMMARY

In one aspect, a disclosed method for managing power in an information handling system may include determining a fan speed value associated with a fan speed used to cool a particular hardware configuration of the information handling system. The method may also include determining a power value associated with a power consumed by a fan running at the determined fan speed value. The method may further include managing power within the information handling system based on the determined fan speed value and the determined power value. For example, managing power may include limiting a fan speed of the fan to be less than the fan speed value, determining a power margin as a difference between a maximum power at which the fan may run and the determined power value, and reallocating the power margin within the information handling system.

Other disclosed aspects include an article of manufacture including a machine-readable medium having instructions that, when read by a processor, may cause the processor to determine a fan speed value associated with a fan speed used to cool a particular hardware configuration of the information handling system. The instructions may further cause the processor to determine a power value associated with a power consumed by a fan running at the determined fan speed value. The instructions may further cause the processor to manage power within the information handling system based on the determined fan speed value and the determined power value.

Other disclosed aspects include an information handling system having a fan, a processor, and a machine-readable medium with instructions that, when read by the processor, may cause the processor to determine a fan speed value associated with a fan speed used to cool a particular hardware configuration of the information handling system. The instructions may further cause the processor to determine a power value associated with a power consumed by a fan running at the determined fan speed value. The instructions may further cause the processor to manage power within the information handling system based on the determined fan speed value and the determined power value.

BRIEF DESCRIPTION OF THE DRAWINGS

For a more complete understanding of the present invention and its features and advantages, reference is now made to the following description, taken in conjunction with the accompanying drawings, in which:

FIG. 5A is a table illustrating selected elements of an embodiment of inventory information used by a thermal control module to determine a fan speed value;

FIG. 5B is a table illustrating selected elements of an embodiment of a power parameter lookup table (LUT) used by a thermal control module to determine a fan speed value;

FIG. 5C is a table illustrating selected elements of an embodiment of a power parameter LUT used by a thermal control module to determine a fan speed value;

FIG. 6 is a graph illustrating selected elements of an embodiment of a thermal resistance model associating calculated thermal resistance values to fan speeds for components within an information handling system.

FIG. 7 is a table illustrating selected elements of an embodiment of a power value LUT used by a thermal control module to determine a power value corresponding to a determined fan speed value.

DESCRIPTION OF PARTICULAR EMBODIMENT(S)

Figure 1:
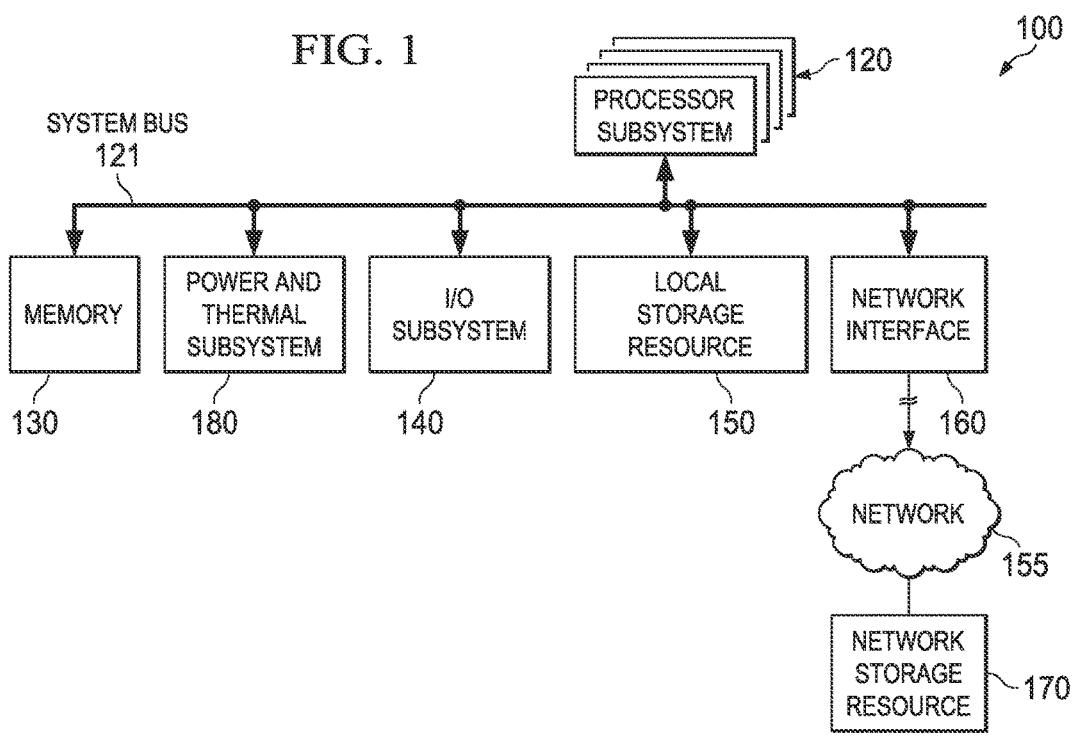
FIG. 1 is a block diagram of selected elements of an embodiment of an information handling system.

In the following description, details are set forth by way of example to facilitate discussion of the disclosed subject matter. It should be apparent to a person of ordinary skill in the field, however, that the disclosed embodiments are exemplary and not exhaustive of all possible embodiments.

For the purposes of this disclosure, an information handling system may include an instrumentality or aggregate of instrumentalities operable to compute, classify, process, transmit, receive, retrieve, originate, switch, store, display, manifest, detect, record, reproduce, handle, or utilize various forms of information, intelligence, or data for business, scientific, control, entertainment, or other purposes. For example, an information handling system may be a server, a personal computer, a PDA, a consumer electronic device, a network storage device, or another suitable device and may vary in size, shape, performance, functionality, and price. The information handling system may include memory, one or more processing resources such as a central processing unit (CPU) or hardware or software control logic. Additional components or the information handling system may include one or more storage devices, one or more communications ports for communicating with external devices as well as various input and output (I/O) devices, such as a keyboard, a mouse, and a video display. The information handling system may also include one or more buses operable to transmit communication between the various hardware components.

Additionally, the information handling system may include firmware for controlling and/or communicating with, for example, hard drives, network circuitry, memory devices, I/O devices, and other peripheral devices. As used in this disclosure, firmware includes software embedded in an information handling system component used to perform predefined tasks. Firmware is commonly stored in non-volatile memory, or memory that does not lose stored data upon the loss of power. In certain embodiments, firmware associated with an information handling system component is stored in non-volatile memory that is accessible to one or more information handling system components. In the same or alternative embodiments, firmware associated with an information handling system component is stored in non-volatile memory that is dedicated to and comprises part of that component.

For the purposes of this disclosure, computer-readable media may include an instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory (SSD); as well as communications media such wires, optical fibers, microwaves, radio waves, and other electromagnetic and/or optical carriers; and/or any combination of the foregoing.

Particular embodiments are best understood by reference to FIGS. 1-5 wherein like numbers are used to indicate like and corresponding parts.

FIG. 1 illustrates a block diagram of selected elements of an embodiment of an information handling system 100. In certain embodiments, information handling system 100 may be configured to regulate its own airflow and/or to regulate airflow within another information handling system. Also shown with information handling system 100 are external or remote elements, namely, network 155 and network storage resource 170.

As shown in FIG. 1, components of information handling system 100 may include, but are not limited to, processor subsystem 120, which may comprise one or more processors, and system bus 121 that communicatively couples various system components to processor subsystem 120 including, for example, memory subsystem 130, I/O subsystem 140, local storage resource 150, and network interface 160. System bus 121 may represent a variety of suitable types of bus structures, such as a memory bus, a peripheral bus, or a local bus using various bus architectures in selected embodiments. For example, such architectures may include, but are not limited to, Micro Channel Architecture (MCA) bus, Industry Standard Architecture (ISA) bus, Enhanced ISA (EISA) bus, Peripheral Component Interconnect (PCI) bus, PCI Express (PCIe) bus, HyperTransport (HT) bus, and Video Electronics Standards Association (VESA) local bus.

In FIG. 1, network interface 160 may be a suitable system, apparatus, or device operable to serve as an interface between information handling system 100 and a network 155. Network interface 160 may enable information handling system 100 to communicate over network 155 using a suitable transmission protocol and/or standard, including, but not limited to, transmission protocols and/or standards enumerated below with respect to the discussion of network 155. In some embodiments, network interface 160 may be communicatively coupled via network 155 to network storage resource 170. Network 155 may be implemented as, or may be a part of, a network attached storage (NAS), a storage area network (SAN), personal area network (PAN), local area network (LAN), a metropolitan area network (MAN), a wide area network (WAN), a wireless local area network (WLAN), a virtual private network (VPN), an intranet, the Internet or another appropriate architecture or system that facilitates the communication of signals, data and/or messages (generally referred to as data). Network 155 may transmit data using a desired storage and/or communication protocol, including, but not limited to, Fibre Channel, Frame Relay, Asynchronous Transfer Mode (ATM), Internet protocol (IP), other packet-based protocol, small computer system interface (SCSI), Internet SCSI (iSCSI), Serial Attached SCSI (SAS) or another transport that operates with the SCSI protocol, advanced technology attachment (ATA), serial ATA (SATA), advanced technology attachment packet interface (ATAPI), serial storage architecture (SSA), integrated drive electronics (IDE), and/or any combination thereof. Network 155 and its various components may be implemented using hardware, software, or any combination thereof. In certain embodiments, information handling system 100 and network 155 may be included in a rack domain.

As depicted in FIG. 1, processor subsystem 120 may comprise a system, device, or apparatus operable to interpret and/or execute program instructions and/or process data, and may include one or more microprocessors, microcontrollers, digital signal processors (DSPs), application specific integrated circuits (ASICs), or other digital or analog circuitry configured to interpret and/or execute program instructions and/or process data. In some embodiments, processor subsystem 120 may interpret and/or execute program instructions and/or process data stored locally (e.g., in memory subsystem 130). In the same or alternative embodiments, processor subsystem 120 may interpret and/or execute program instructions and/or process data stored remotely (e.g., in network storage resource 170).

Also in FIG. 1, memory subsystem 130 may comprise a system, device, or apparatus operable to retain and/or retrieve program instructions and/or data for a period of time (e.g., computer-readable media). Memory subsystem 130 may comprise random access memory (RAM), electrically erasable programmable read-only memory (EEPROM), a PCMCIA card, flash memory, magnetic storage, opto-magnetic storage, and/or a suitable selection and/or array of volatile or non-volatile memory that retains data after power to its associated information handling system, such as information handling system 100, is powered down.

In FIG. 1, local storage resource 150 may comprise computer-readable media (e.g., hard disk drive, solid state drive, floppy disk drive, CD-ROM, and/or other types of rotating storage media, flash memory, EEPROM, and/or other types of solid state storage media) and may be generally operable to store instructions and/or data. For example, local storage resource 150 may store executable code in the form of program files that may be loaded into memory subsystem 130 for execution. In information handling system 100, I/O subsystem 140 may comprise a system, device, or apparatus generally operable to receive and/or transmit data to/from/within information handling system 100. I/O subsystem 140 may represent, for example, a variety of communication interfaces, graphics interfaces, video interfaces, user input interfaces, and/or peripheral interfaces. In certain embodiments, I/O subsystem 140 may comprise a touch panel and/or a display adapter. The touch panel (not shown) may include circuitry for enabling touch functionality in conjunction with a display (not shown) that is driven by display adapter (not shown).

As shown, information handling system 100 may also include a power and thermal subsystem 180. Power and thermal subsystem 180 may include one or more components such as power supplies, fans, etc., configured to provide power to other components within information handling system 100 and to ensure that thermal design constraints for the components are met (e.g., by cooling the components). Accordingly, certain components included within information handling system 100 (e.g., components within processor subsystem 120, memory 130, etc.) may operate by consuming power provided by power and thermal subsystem 180. In certain examples, power engineers and other designers of information handling system 100 may budget and account for power expected to be consumed by one or more of the components and may design power and thermal subsystem 180 to include an appropriate power supply configured to power the components. Available power for powering the components of information handling system 100 may be a scarce resource. For example, a power supply may constitute a significant portion of the total cost of information handling system 100 and, thus, the total cost of information handling system 100 may be reduced when less expensive power supplies configured to supply less power are employed rather than more expensive power supplies that may supply more power.

Components included within information handling system 100 may be highly customizable and prone to change based on the needs of a customer or user purchasing information handling system 100. For example, customizations may be made when initially provisioning the information handling system or dynamically when the information handling system is deployed. For example, before sale, a customer may select to include a particular number of processors (e.g., 1, 2, or 4 processors) in information handling system 100. In the field, the customer may choose to install one or more I/O devices or interfaces (e.g., USB devices, PCIe cards, etc.). Various other aspects of a hardware configuration may also be customizable such as memory components, storage components, and other components used in information handling system 100.

Because power used by different combinations of processors, I/O cards, and/or other components included in various hardware configurations may vary widely, certain hardware configurations of information handling system 100 may consume considerably more power than other hardware configurations. For example, one hardware configuration employing 1 processor, minimal memory and storage, and few I/O devices may use significantly less power than another hardware configuration employing 2 processors, a moderate amount of memory and storage, and additional I/O devices. A "fully-loaded" hardware configuration in this example may include 4 processors, a maximum amount of memory and storage, and all the I/O devices and other components that information handling system 100 may support. Thus, the fully-loaded hardware configuration may consume a maximum amount of power that is significantly more than the power used by the other hardware configurations. Additionally, power use in information handling system 100 may vary based on the processing that information handling system 100 is performing at a particular moment in time. For example, certain customers and/or applications may operate information handling system 100 at or near full capacity while other customers and/or applications may give information handling system 100 a lighter processing load that requires less power.

Components of information handling system 100 consuming power may also generate heat, causing these components and/or other components around them to heat up. Certain components of information handling system 100 may not operate correctly if heated beyond a particular temperature threshold. Thus, in some embodiments, power and thermal subsystem 180 may be configured to cool information handling system 100 and the components therein by one or more fans that also consume power and may be accounted for in system power budgets.

Figure 2:
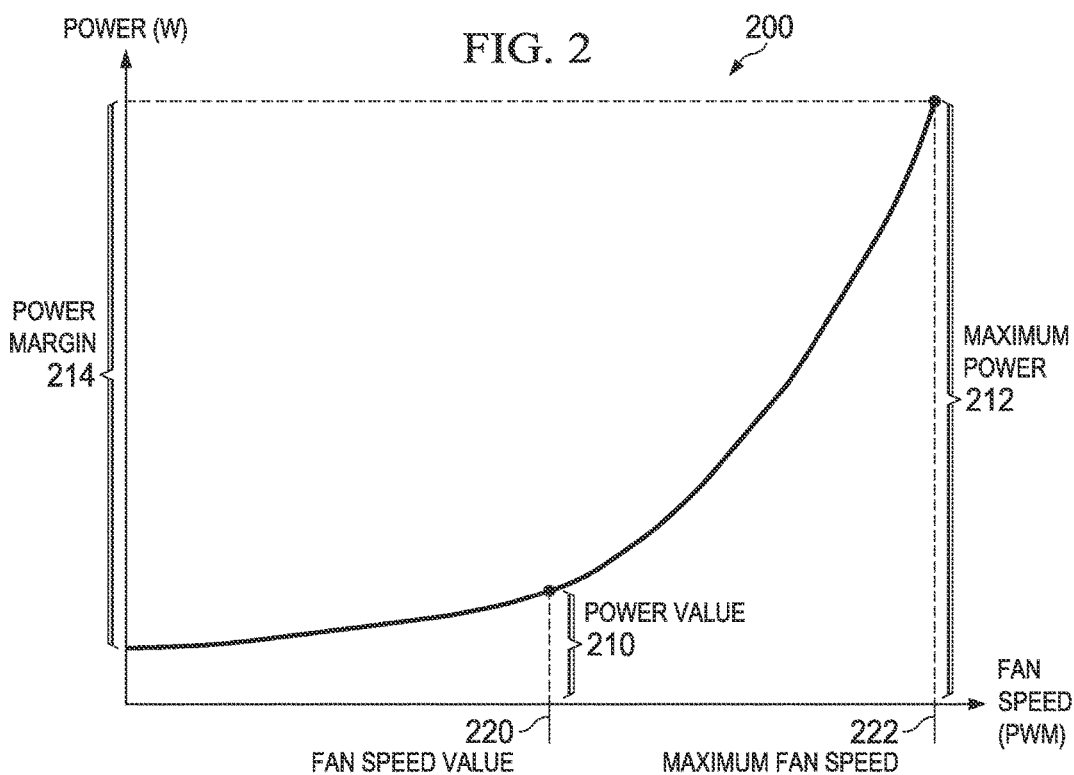
FIG. 2 is an exemplary plot illustrating a power consumption of one or more fans within an information handling system as a function of fan speed.

FIG. 2 shows an exemplary plot 200 illustrating a power consumption of one or more fans within information handling system 100 as a function of fan speed. The one or more fans associated with plot 200 may operate cooperatively to generate airflow and thereby cool information handling system 100. In some embodiments, each of the one or more fans may be associated with a particular region of information handling system 100 and may be specifically configured to cool that particular region. In these embodiments, for example, each fan may have a different fan speed customized to properly cool the components within the respective region of each fan, some of which may generate more heat than others. For clarity and simplicity of description within the present disclosure, it will be assumed that a plurality of fans are employed and that all fans within information handling system 100 are identical and run at identical fan speeds to collectively cool information handling system 100.

In certain embodiments, the fan speed of the fans may be controlled using pulse width modulation (PWM), as illustrated along the x-axis of plot 200 in FIG. 2. Power consumption may be measured in Watts (W), as shown along the y-axis. In some examples, the power consumption of the fans may increase non-linearly (e.g., exponentially) with fan speed. Thus, as shown in FIG. 2, the power consumption of the fans accelerates with respect to fan speed as fan speed increases toward maximum fan speed 222.

Maximum fan speed 222 may correspond to a maximum speed at which the fans are capable of operating. Specifically, maximum fan speed 222 may correspond to a PWM duty cycle of 100% (always on). In other examples, maximum fan speed 222 may correspond to a speed at which the fans operate in a thermal worst-case scenario in information handling system 100. For example, maximum fan speed 222 may correspond to a fan speed needed to properly cool information handling system 100 when information handling system 100 is configured with a fully-loaded hardware configuration, is operating at full capacity, and/or is otherwise consuming a maximum amount of power.

Maximum power 212 may be the power consumed by the fans when the fans operate at maximum fan speed 222. Maximum power 212 may be a relatively large amount of power. For example, maximum power 212 may constitute a significant portion of a power budget for information handling system 100. Moreover, because maximum power 212 may correspond to a worst-case thermal scenario significantly worse than a typical thermal scenario, maximum power 212 may be considerably greater than a typical power that information handling system 100 uses to operate the fans under normal circumstances and/or with a more typical hardware configuration than the fully-loaded hardware configuration. Accordingly, system power may be managed in various ways such as by limiting (e.g., throttling) the fan speed of the fans to correspond to cooling only the more typical thermal scenario such that the power otherwise used to cool the worst-case thermal scenario may be freed up and reallocated. For example, a power margin that is the difference between a maximum power of the fans and an upper power value used by the fans when the fan speed is limited may be used elsewhere in information handling system 100. Managing power based on determined fan speed values and corresponding power values in this way or in various other ways may be particularly advantageous when power is scarce and may reduce power supply costs and/or allow additional components to be included in information handling system 100 without upgrading to a larger or more expensive power supply.

Information handling system 100 may include a baseboard management control subsystem that, among other tasks, may manage power and thermal considerations within information handling system 100. A baseboard management control subsystem may be integrated with or use components of one or more of processor subsystem 120, memory subsystem 130, and power and thermal subsystem 180. For example, the baseboard management control subsystem may limit the fan speed of the fans to free up and reallocate power as described above. To do so, the baseboard management control subsystem may determine fan speed value 220, determine power value 210 based on fan speed value 220, and limit the fan speed of the fans to be approximately equal to or less than the fan speed value. Based on the limiting of the fan speed, power margin 214 may be freed up and reallocated for use in information handling system 100.

As shown in FIG. 2, fan speed value 220 may be less than maximum fan speed 222. More specifically, the baseboard management control subsystem may determine fan speed value 220 to be less than a maximum speed at which the fan can operate (e.g., with a PWM duty cycle of 100%) and/or less than a maximum speed used to cool a fully-loaded hardware configuration of information handling system 100. As such, fan speed value 220 may be associated with cooling a hardware configuration of information handling system 100 that consumes less power than a worst-case and/or fully-loaded hardware configuration.

Power value 210 may correspond to the power used by the one or more fans running at fan speed value 220. As such, power value 210 may be less than maximum power 212 because power value 210 may correspond to the power used to cool a hardware configuration that uses less power than the fully-loaded hardware configuration cooled with maximum power 212.

Power margin 214 illustrates the difference in power between maximum power 212 and power value 210. Thus, power margin 214 illustrates an exemplary amount of power that may be reallocated for use in information handling system 100 when the fan speed of the one or more fans is limited to fan speed value 220. As shown, power margin 214 may be large if the hardware configuration upon which fan speed value 220 is based is significantly less than the fully-loaded hardware configuration. However, because of the non-linearity of plot 200, the power reallocation associated with power margin 214 may still be significant even with a fan speed value only slightly lower than maximum fan speed 222.

Power may be managed based on fan speed value 220 and power value 210 in any suitable way. For example, managing power based on fan speed value 220 and power value 210 may include providing values 210 and/or 220 to an output log or output display to be viewed by a user or used by an automated process, providing values 210 and/or 220 to other hardware and/or software modules within information handling system 100 or another information handling system for use by those modules, and/or for any other purpose that may facilitate power management within information handling system 100. In some embodiments, managing power may include limiting a fan speed of the one or more fans to be less than fan speed value 220, determining power margin 214 as the difference between maximum power 212 and power value 210, and reallocating power margin 214 within information handling system 100.

Power margin 214 may be reallocated in any suitable way. For example, power margin 214 may be reallocated to allow design constraints on various components within information handling system 100 to be loosened by distributing power margin 214 amongst the power budgets of the various components to give each of the various components more power margin. In the same or other examples, power margin 214 may allow additional components to be added to or enabled in information handling system 100 that would not fit within a power budget of information handling system 100 otherwise. In certain embodiments, due to the reallocating of the power margin, a power supply may be used to power a hardware configuration of the information handling system that consumes less than maximum power 212, even though the power supply may be insufficient to power a fully-loaded hardware configuration of the information handling system. In this way, a power supply with lower capacity and lower cost may be substituted for a more expensive power supply, providing cost savings to providers and/or customers of information handling system 100.

Figure 3:
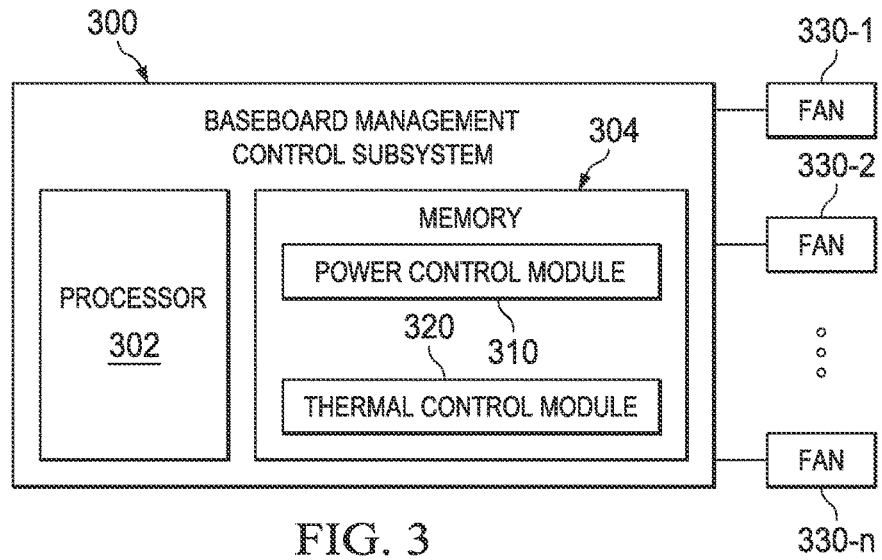
FIG. 3 is a block diagram of selected elements of an embodiment of a baseboard management control subsystem communicatively coupled with one or more fans.

Referring now to FIG. 3, a block diagram of selected elements of an embodiment of a baseboard management control subsystem 300 communicatively coupled with one or more fans 330 (e.g., fans 330-1 through 330-n) is illustrated. FIG. 3 is a schematic illustration and is not drawn to scale. In FIG. 3, baseboard management control subsystem 300 may control fans 330 to regulate airflow within or to otherwise cool information handling system 100. For example, fans 330 may be included within power and thermal subsystem 180 and may cool information handling system 100 according to the principles described above in relation to FIG. 2. Specifically, fans 330 may be implemented by standard or specially-designed computer fans and may be controlled using PWM or by other methods. One or more of fans 330 may be associated with a circuit board within information handling system 100 and may cause an airflow to move across the circuit board. One or more other fans 330 may be associated with particular components of information handling system 100 (e.g., CPUs) and may be coupled directly to heat sinks associated with the components to provide increased cooling for the particular components.

In certain embodiments, baseboard management control subsystem 300 may be integrated with or included within information handling system 100. For example, baseboard management control subsystem 300 may be integrated within or use components of one or more of processor subsystem 120, memory subsystem 130, power and thermal subsystem 180, and/or other components of information handling system 100 (see FIG. 1). In other embodiments, baseboard management control subsystem 300 may be independent from information handling system 100. For example, baseboard management control subsystem 300 may be integrated with an information handling system tasked with cooling one or more other information handling systems including information handling system 100.

As shown, baseboard management control subsystem 300 includes processor 302. Processor 302 may be implemented by any type of processor, such as a microcontroller (e.g., a baseboard management controller (BMC)), a digital signal processor (DSP), a field-programmable gate-array, an application-specific integrated circuit, digital or analog circuitry, etc. In embodiments where baseboard management control subsystem 300 is integrated with or included within information handling system 100, certain components of baseboard management control subsystem 300 may be associated with or the same as components of information handling system 100, described above in relation to FIG. 1. For example, processor 302 of baseboard management control subsystem 300 may be associated with and/or may partially or fully implement processor subsystem 120. Specifically, processor subsystem 120 may include one or more platform CPUs communicatively coupled to a BMC embedded within information handling system 100 to manage the interface between the platform CPUs and system management software such as for managing power, controlling fans, etc. Accordingly, by integrating baseboard management control subsystem 300 within information handling system 100 and using baseboard management control subsystem 300 to control fans 330, information handling system 100 may self-regulate its own temperature.

Processor 302 may be communicatively coupled to memory 304. Memory 304 may be implemented by computer-readable memory media. For example, memory 304 may encompass persistent and volatile media, fixed and removable media, and magnetic and semiconductor media, among others. Memory 304 is operable to store instructions, data, or both. For example, instructions stored in memory 304 may take any suitable form such as code, functions, libraries, scripts, applications, firmware, etc. Memory 304 may include or store sets or sequences of instructions executable by processor 302, as well as other information, such as data related to power or thermal management and fan control, as disclosed herein.

As shown, memory 304 may store power control module 310 and thermal control module 320. Power control module 310 and thermal control module 320 may be implemented as code, functions, libraries scripts, applications, firmware, or by any other suitable form. By executing instructions included within power control module 310 and/or thermal control module 320, baseboard management control subsystem 300 may perform at least some of the functionality described herein such as determining a fan speed value, determining a power value, and managing power within the information handling system such as by limiting fans 330 to be less than the determined fan speed value, determining a power margin freed up by limiting fans 330, and reallocating the power margin within the information handling system. Power control module 310 and thermal control module 320 will be described in more detail below in relation to FIG. 4.

Figure 4:
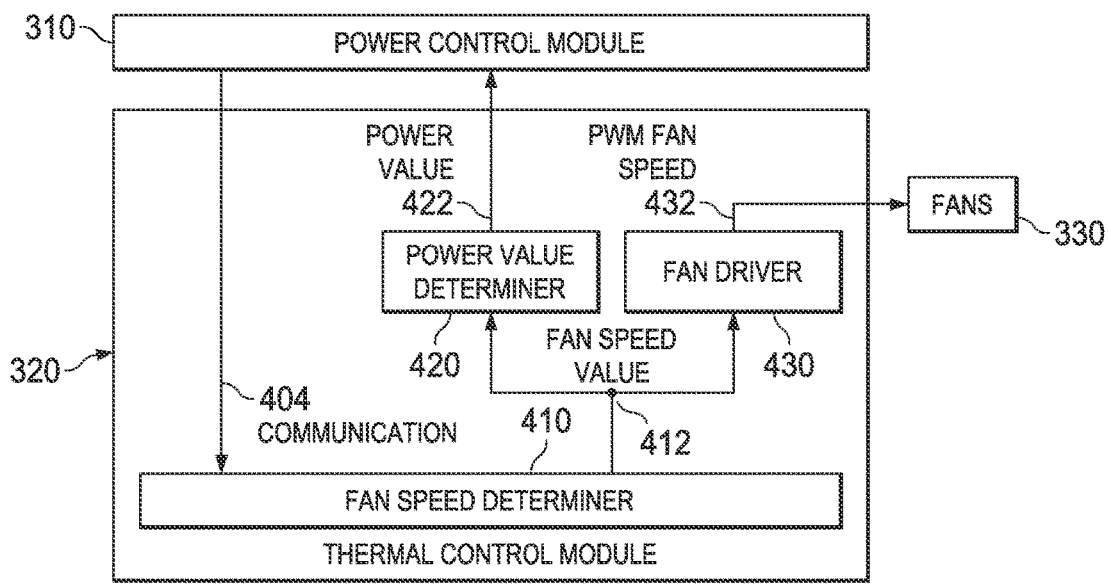
FIG. 4 is a block diagram of selected elements of an embodiment of a power control module and a thermal control module running within a baseboard management control subsystem.

FIG. 4 illustrates a block diagram of selected elements of an embodiment of a power control module and a thermal control module running within a baseboard management control subsystem. Specifically, FIG. 4 shows a more detailed view of power control module 310 and thermal control module 320 running within baseboard management control subsystem 300, described above in relation to FIG. 3.

As shown, thermal control module 320 may be communicatively coupled to fans 330 and may be capable of driving fans 330 to produce airflow for cooling various components of information handling system 100. For example, thermal control module 320 may limit fans 330 to a determined fan speed value that may allow fans 330 to suitably cool a particular hardware configuration of information handling system 100 but not necessarily to suitably cool a fully-loaded hardware configuration of information handling system 100. As such, fans 330 may be operated at less than their full capacity to generate a power margin that may be reallocated for use elsewhere in information handling system 100.

Power control module 310 may be configured to manage power within information handling system 100. Power control module 310 may be integrated with or separate from thermal control module 320 in any way that suits a particular embodiment. For example, power control module 310 and thermal control module 320 may each run on the same processor (e.g., processor 302 in FIG. 3) and the same memory (e.g., memory 304 in FIG. 3), but may include two separate sets of instructions within the memory running on the processor in parallel. In other embodiments, power control module 310 and thermal control module 320 may both be integrated into a single set of instructions, or may include separate sets of instructions in separate memories running on separate processors (not shown in FIG. 3).

Power control module 310 may be configured to relay information to thermal control module 320, as illustrated by communication 404 in FIG. 4. For example, power control module 310 may provide information over communication 404 about power considerations within information handling system 100 that may facilitate the determination of the fan speed value, the determination of the power value, and/or other functionality of thermal control module 320. Specifically, power control module 310 may provide inventory information about components populated in the hardware configuration of information handling system 100, power parameters and thermal performance metrics of information handling system 100 and/or the components populated in its hardware configuration, fan speeds measured during system characterization tests, maximum ambient temperature parameters, power look-up tables (LUTs), correlation coefficients for power curves, data associated with thermal resistance models, and/or any other information that may facilitate proper and efficient operation of thermal control module 320.

Similarly, power control module 310 may receive information from thermal control module 320 to facilitate proper and efficient power management within information handling system 100. For example, as illustrated by power value 422, power control module 310 may receive a power value indicative of the maximum power that fans 330 may be allowed to consume. In various embodiments, power control module 310 may facilitate capping the power that fans 330 may consume based on the power value or power control module 310 may rely on thermal control module 320 to partially or completely enforce the power value on fans 330.

In certain embodiments, power control module 310 may use power value 422 to determine a power margin that is freed up by limiting the power that may be consumed by fans 330. For example, power control module 310 may determine the power margin to be the difference between power value 422 and the power that fans 330 would consume at full capacity (e.g., with no fan speed limiting). In certain embodiments, the determination of the power margin may be made within thermal control module 320 and power control module 310 may receive the determined power margin.

Once the power margin has been determined, power control module 310 may reallocate the power associated with the power margin for use in information handling system 100 in any suitable way. For example, as described above in reference to power margin 214 of FIG. 2, the power margin may be redistributed to provide relaxed power constraints for existing components of information handling system 100, to allow additional components to be added to information handling system 100, to allow a power supply with relatively low capacity to supply power to a hardware configuration that may otherwise use a higher capacity power supply, and/or for any other suitable purpose within a particular embodiment.

Thermal control module 320 may include fan speed determiner 410 for determining the fan speed value associated with cooling the hardware configuration of information handling system 100. Thermal control module 320 may also include power value determiner 420 for determining a power value used by fans 330 when running at the fan speed value. Thermal control module 320 may also include fan driver 430 for controlling fans 330, including freeing up power margin by limiting the fan speed of fans 330 to be approximately equal to or less than the fan speed value. Thermal control module 320 may contain additional or fewer components than the components shown in FIG. 4 as may suit a particular embodiment. Each of the components of thermal control module 320 will be described in more detail below.

Modules of thermal control module 320 may communicate with each other, and may communicate with power control module 310 and/or other components not shown in FIG. 4 (e.g. fans 330). For example, as shown in FIG. 4, fan speed determiner 410 may communicate fan speed value 412 to power value determiner 420 and fan driver 430, power value determiner 420 may communicate power value 422 to power control module 310, and fan driver 430 may communicate PWM fan speed 432 to fans 330. In various embodiments, fewer or additional inputs and outputs for communicating within thermal control module 320 and with power control module 310 and/or other software or hardware within information handling system 100 may be employed.

Fan speed determiner 410 may accept communication 404 from power control module 310 as an input and may provide fan speed value 412 as an output. Fan speed value 412 may be an embodiment of fan speed value 220 (see FIG. 2) and may be used to facilitate reallocation of power from fans to other components within information handling system 100. More specifically, fan speed value 412 may represent a fan speed that is determined to be suitable for fans within information handling system 100 to cool a specific hardware configuration of information handling system 100 that fan speed determiner 410 takes into account.

To generate fan speed value 412, fan speed determiner 410 may receive, process, analyze, synthesize, and/or take into account any suitable inputs that may facilitate proper and efficient determination of fan speed value 412. To illustrate, several specific embodiments of fan speed determiner 410 are described below. However, it is noted that the embodiments of fan speed determiner 410 described herein are exemplary only and not limiting. Accordingly, fan speed determiner 410 may receive any inputs and generate fan speed value 412 by various combinations of the embodiments described and/or by other methodologies recognized by persons of skill in the art.

In one embodiment, fan speed determiner 410 may determine fan speed value 412 based on inventory information associated with one or more components or sets of components included in the hardware configuration and based on one or more power parameters associated with power consumed by the hardware configuration and/or the components therein. For example, FIG. 5A shows a table illustrating selected elements of an embodiment of inventory information 500 that may be used by fan speed determiner 410 to determine fan speed value 412. The information in inventory information 500 may be provided by any suitable source, including by being entered by a user. In certain examples, power control module 310 may detect components within the hardware configuration and may provide inventory information 500 over communication 404. Inventory information 500 provides an illustration of exemplary inventory items that may be present in a particular hardware configuration of an information handling system. In various embodiments, inventory information 500 may include different items and may include additional or fewer items than shown in FIG. 5A.

As shown in FIG. 5A, quantity column 502 of inventory information 500 includes a quantity corresponding to each component or set of components of component column 504 that may be populated in a particular hardware configuration of information handling system 100. For example, the particular hardware configuration of information handling system 100 illustrated in FIG. 5A may include two CPUs, eight dual inline memory modules (memory DIMMs), zero 10 W PCIe cards, two 25 W PCIe cards, and one 75 W PCIe card.

FIGS. 5B and 5C are tables illustrating selected elements of different embodiments of a power parameter lookup table (LUT) used by fan speed determiner 410 to determine fan speed value 412. The information in the power parameter LUTs 510 (see FIG. 5B) and 520 (see FIG. 5C) may be provided by any suitable source, including by being entered by a user. In certain examples, power control module 310 may provide power parameter LUTs 510 and 520 over communication 404. Power parameter LUTs provide illustrations of exemplary power usage and fan speeds for exemplary inventory items that may be populated in an information handling system. In various embodiments, power parameter LUTs 510 and 520 may include different items and may include additional or fewer item than shown in FIGS. 5B and 5C.

As shown in FIG. 5B, power column 514 of power parameter LUT 510 includes a power parameter, measured in Watts (W), corresponding to each component of component column 512 that may be populated in the particular hardware configuration. The power parameters shown in power parameter column 514 may be based on a pre-characterization of the corresponding component or set of components. For example, the power used by various components of information handling system 100 may be manually characterized while information handling system 100 is being developed and/or tested. Engineers and technicians performing the power characterization of the components may program data related to the power use of each component or set of components into power parameter LUT 500 in information handling system 100. In certain examples, the characterized power parameters included in power parameter LUT 500 may represent the maximum power that the component may consume within information handling system 100. This characterized maximum power parameter may be the same or different from a datasheet maximum power parameter specified as a maximum power the component may consume by a supplier of the component. For example, in FIG. 5B, each CPU populated in information handling system 100 may have a datasheet maximum power parameter of 100 W but may have been characterized to consume no more than 92 W. Similarly, each 10 W PCIe card may have a datasheet maximum power parameter of 10 W but may have been characterized to consume no more than 9 W. Other components shown in FIG. 5B may have similar differentials between their datasheet maximum power parameters and their characterized maximum power parameters entered in power parameter LUT 510. In other embodiments of FIG. 5B (not shown), the datasheet maximum power parameters may be used rather than characterized maximum power parameters.

As further illustrated in FIG. 5B, fan speed column 516 of power parameter LUT 510 may include a fan speed percentage corresponding to each component of component column 512 that may be populated in the particular hardware configuration. The fan speed parameters shown in fan speed column 516 may be based on a pre-characterization of the corresponding component or set of components. For example, the fan speed of fans cooling the components of component column 512 may be measured while the components are being characterized and are consuming their characterized maximum power as described above in relation to FIG. 5A. Engineers and technicians performing the power characterization of the components may program data related to the fan speed used to cool each component or set of components into power parameter LUT 500. For example, as shown in FIG. 5B, each CPU populated in the hardware configuration of information handling system 100 may be measured by the engineers and technicians to cause the fan speed to increase by 18% in order to cool the CPU. Similarly, each memory DIMM populated in the hardware configuration may cause the fan speed to increase by 1%. Other components in component column 512 may cause fan speed increases as shown in fan speed column 516.

Accordingly, in operation, fan speed determiner 410 may receive (e.g., as an input from power control module 310) inventory information 500 indicative of one or more components or sets of components present in the hardware configuration of information handling system 100. Along with the inventory information, fan speed determiner 410 may also receive power parameters and/or fan speed parameters (e.g., obtained from pre-characterization of the components and/or from datasheets) stored in power parameter LUT 510. Fan speed determiner 410 may be configured to access power parameter LUT 510 directly or may receive the information as an input from power control module 310. Fan speed determiner 410 may then combine inventory information 500 and the fan speeds and/or the power parameters in any suitable way to determine an appropriate fan speed value 412 for the particular hardware configuration associated with the inventory. For example, in embodiments where fan speeds are included in power parameter LUT 510 (see FIG. 5B), the fan speeds may be summed according to the inventory of components. Specifically, the hardware configuration in the example would use 18% fan speed to cool each of the two CPUs (36% total), 1% fan speed to cool each of the eight memory DIMMs (8% total), 2% fan speed to cool each of the two hard disk drives (4% total), 4% fan speed to cool each of the two 25 W PCIe cards (8% total) and 16% fan speed to cool the 75 W PCIe card (16% total). By summing the totals together (e.g., summing 36%, 8%, 4%, 8%, and 16%), fan speed determiner 410 may assign the hardware configuration a fan speed value of 72%.

In embodiments where fan speed determiner 410 receives power parameters from power parameter LUT 510 but not fan speeds, fan speed determiner 410 may determine fan speeds corresponding to the power parameters in any suitable way such as by calculating the fan speeds according to a power-to-fan-speed formula or by looking up the fan speeds in a LUT. In some examples, fan speed determiner 410 may sum all the power parameters together and determine the fan speed for the total characterized maximum power consumed by the hardware configuration.

In certain embodiments, fan speed determiner 410 may employ a baseline hardware configuration as a starting point from which to calculate fan speed value 412. For example, components in the baseline hardware configuration may be determined (e.g., by manual pre-characterization) to be associated with a baseline fan speed value. Fan speed value 412 may then be determined based on additional cooling needed for additional components of the specific hardware configuration that are not accounted for by the baseline hardware configuration.

For example, FIG. 5C shows a table illustrating selected elements of an embodiment of a power parameter LUT 520 used by fan speed determiner 410 to determine fan speed value 412. As shown, power parameter LUT 520 has a component upgrade column 522 and corresponding power parameter column 524 and fan speed column 526. Whereas component column 512 of power parameter LUT 510 (see FIG. 5B) listed each component present in a hardware configuration, component upgrade column 522 in power parameter LUT 520 may only list component upgrades, or additional components not included in the hardware configuration baseline. For example, each additional CPU above a number of CPUs included in a baseline hardware configuration (e.g., above 1 CPU) may add 92 W to the total power of the hardware configuration and/or 18% to the fan speed used to cool the hardware configuration. One advantage of using a baseline hardware configuration as a starting point is that each and every component may not need to be accounted for. For example, each memory DIMM added to a hardware configuration may have an almost negligible effect on the fan speed used to cool the hardware configuration. However, if the memory DIMMs are all in use (e.g., memory fully-loaded), the memory DIMMs may have a significant effect on the power consumed by the hardware configuration and/or the fan speed used to cool the hardware configuration. Accordingly, the power parameters and fan speed parameters in power parameter LUT 520 step up in larger steps, even though fan speed value 412 may be determined to be similar or identical as that determined by power parameter LUT 510 for a particular hardware configuration.

By determining the fan speed value according to the baseline approach, a power parameter LUT might not store every possible combination that a hardware configuration could take. However, in other embodiments, a power parameter LUT might store power and/or fan speed parameters for one or more particular hardware configurations with particular combinations of components. In various embodiments, fan speed determiner 410 may employ a different type of structure or hierarchy for programming the power parameter LUT based on one or more baseline hardware configurations of the information handling system.

In the same or other embodiments, fan speed determiner 410 may determine fan speed value 412 based on the inventory information and power parameters as described above, as well as on a thermal performance metric associated with one or more components or sets of components in information handling system 100. For example, a thermal performance metric may indicate the relationship between fan speed and an amount by which a particular component heats up for every unit of power consumed. Thermal performance metrics for various components may be manually pre-characterized and/or may be specified by suppliers selling the components (e.g., in a design datasheet). Accordingly, the thermal performance metrics of one or more components may be included in a thermal performance LUT similar to power performance LUTs 510 and 520 illustrated respectively in FIGS. 5B and 5C. In other embodiments, thermal performance metrics may be included in a power performance LUT in an additional column (not shown in FIGS. 5B and 5C). Fan speed determiner 410 may use thermal performance metrics as an alternative to or in addition to power parameters and/or fan speed parameters from a power parameter LUT to determine fan speed value 412.

In certain embodiments, fan speed determiner 410 may determine fan speed value 412 by detecting the fan speed of the fan in response to the hardware configuration processing a simulated workload in a controlled environment, and determine fan speed value 412 based on the detected fan speed. For example, information handling system 100 may include an in-system characterization feature to thermally stress components of information handling system 100 by forcing the components to run at or near their full power capacity. In-system characterization may occur during design and testing, or in the field (e.g., after purchase by a customer). In-system characterization may be performed on demand (e.g., by an operator providing an instruction to information handling system 100) or automatically, such as every time information handling system 100 boots up. A simulated workload such as in-system characterization may create a controlled environment where some or all components within information handling system 100 are thermally stressed so as to operate at a worst-case thermal scenario or to operate at stress levels beyond those reached during normal operations.

While the hardware configuration of information handling system 100 is processing the simulated workload in the controlled environment, fan speed determiner 410 may be configured to detect the fan speed of the fan. For example, without the fan speed being limited by thermal control module 320, fan speed determiner 410 may monitor the fan speed to detect how high the fan speed reaches in response to the high stress (e.g., worst-case) thermal scenario caused by processing the simulated workload. Fan speed determiner 410 may then determine fan speed value 412 based on the detected fan speed. Because the simulated workload may cause the components to operate closer to their full capacity than normal operations do, the fan speed detected during the processing of the simulated workload may determine fan speed value 412 to be lower than full capacity of the fans but sufficiently high to properly cool information handling system 100 during normal operation.

In the same or other embodiments, fan speed determiner 410 may determine fan speed value 412 by use of an airflow sensor within information handling system 100 configured to measure a volume of airflow used to heat various components and/or sets of components within information handling system 100 when running at or near full capacity. For example the airflow sensor may record a volume of air that fans 330 generate in response to the hardware configuration processing a simulated workload such as an in-system characterization test. Based on a volume of air and/or a rate of airflow that the airflow sensor detects, fan speed determiner 410 may determine a fan speed associated with generating the volume of air and/or the rate of airflow and use the fan speed as fan speed value 412. For example, fan speed determiner 410 may correlate the data detected by the airflow sensor using a LUT or fan speed determiner 410 may recreate a particular airflow rate and detect the fan speed that corresponds to generating airflow at the particular rate.

In the same or other embodiments, fan speed determiner 410 may determine fan speed value 412 based on a maximum ambient temperature parameter associated with information handling system 100. For example, a default or custom ambient temperature below which information handling system 100 is to be operated may be specified. Specifically, a default ambient temperature parameter may be set by designers of information handling system 100 based on thermal characterization testing information handling system 100 and/or based on other methodologies. Similarly, a custom ambient temperature parameter may be set by a customer purchasing a particular hardware configuration of information handling system 100, either at the time of purchase or in the field after information handling system 100 has shipped to the customer. In either case, fan speed determiner 410 may take the ambient temperature parameter into account when determining fan speed value 412. For example, if fan speed determiner 410 receives information that the maximum ambient temperature at which information handling system 100 will be operated is relatively low, fan speed determiner 410 may determine that fan speed value 412 may be lower than when the maximum ambient temperature parameter is relatively high. Regardless of which methodology fan speed determiner 410 employs to determine fan speed value 412, extra margin or buffer may be added to fan speed value 412 on top of the fan speed determined by the methods described herein to ensure that a particular hardware configuration will be properly cooled.

In various embodiments, fan speed value 412 may be determined based on a combination of various parameters and techniques described above. For example, fan speed determiner 410 may determine fan speed value 412 based on a thermal resistance model taking into account various parameters such as component temperature parameters, component power consumption parameters, system ambient temperatures, and/or other suitable parameters associated with the set of components in the inventory of the particular hardware configuration.

For example, FIG. 6 shows graph 600 illustrating selected elements of an embodiment of a thermal resistance model associating calculated thermal resistance values to fan speeds for components within an information handling system. Specifically, on y-axis 604, various thermal resistances for components within the inventory of a particular hardware configuration may be represented. For example, the thermal resistance of a component may be calculated as the difference between a temperature parameter of the component and an ambient temperature defined for the system divided by the power consumption of the component. Based on graph 600, a calculated thermal resistance may be used to determine a corresponding fan speed. For example, as shown by point 606, a component having a calculated thermal at a certain point on y-axis 604 corresponds to a particular fan speed on x-axis 602, as defined by graph 600. A thermal resistance model may be implemented by a lookup table within fan speed determiner 410 or by one or more coefficients defining the curve of graph 600.

Referring back to FIG. 4, fan speed determiner 410 may provide fan speed value 412 to power value determiner 420, which may generate power value 422 based on fan speed value 412 and output power value 422 to be used by power control module 310. Power value 422 may be an embodiment of power value 210 (see FIG. 2) and may be used (e.g., by power control module 310) to facilitate reallocation of power from fans to other components within information handling system 100 or to otherwise manage power within information handling system 100 as described above. More specifically, power value 422 may be associated with the power consumed by fans 330 when fans 330 are running at approximately fan speed value 412. Accordingly, power value 422 may represent a maximum amount of power that fans 330 may consume when fans 330 are limited to fan speed value 412. Because power value 422 for a particular hardware configuration of information handling system 100 may be less than a maximum power used by a fully-loaded hardware configuration, power value 422 may be associated with a power margin that may be freed up for reallocation when fans 330 are limited to fan speed value 412 (see power margin 214 in FIG. 2).

To generate power value 422, power value determiner 420 may receive, process, analyze, synthesize, and/or take into account any suitable inputs that may facilitate proper and efficient determination of power value 422. For example, power value determiner 420 may receive fan speed value 412 as an input and may determine power value 422 based on fan speed value 412. Additionally, power value determiner 420 may determine power value 422 using a preprogrammed power value LUT storing a plurality of fan speed values associated within the LUT to corresponding power values. For example, power value determiner 420 may receive fan speed value 412 and may generate power value 422 by looking up a power value that corresponds to fan speed value 412 in the preprogrammed LUT.

As an example, FIG. 7 shows a table illustrating selected elements of an embodiment of a power value LUT 700 used by power value determiner 420 to determine power value 422. The information in power value LUT 700 may be entered and/or stored in the table in any suitable way, including by being entered by a user. In certain examples, power value LUT 700 may be preprogrammed into thermal control module 320 (e.g., within power value determiner 420). In other examples, power control module 310 may provide the information of power value LUT 700 to power value determiner 420.

As shown in FIG. 7, several fan speed values (e.g., referred to in PWM percent) are represented in fan speed value column 702. For simplicity, only certain fan speed values (e.g. fan speed values that are multiples of ten and are greater than or equal to 40) are shown in FIG. 7. For example, it may be determined that a baseline hardware configuration of the information handling system may use up to 40% fan speed so that no hardware configuration would make use of a table entry with a fan speed value less than 40%. However, in certain embodiments of power value LUT 700, additional or fewer fan speed values may be included in fan speed value column 702. For example, fan speed values may be divisible by a number smaller than ten or fan speed values may be lower than 40%.

Power value column 704 includes a power value (e.g., measured in Watts) correlating to each fan speed value in fan speed value column 702. Similarly, power margin column 706 includes a power margin corresponding to each fan speed value and power value. In certain examples, power value column 704 or power margin column 706 may not be included in power value LUT 700 and the power value or the power margin may be calculated from the other by power value determiner 420. For example, when fans 330 within information handling system 100 run at full speed, fans 330 may consume 65 W of power. Accordingly, when no fan speed value is set or the fan speed value is 100% (e.g., for a fully-loaded hardware configuration), fans 330 in information handling system 100 may consume 65 W and power value column 704 may show a power value of 65 W while power margin column 706 shown a power margin of 0 W. As another example, when the fan speed value is set at 90%, the power consumed by fans 330 may not exceed 53 W. Accordingly, power value LUT 700 shows a power value of 53 W and a power margin of 12 W (e.g. the difference between 65 W and 53 W) corresponding to the 90% fan speed value. The power value and power margin numbers in power value LUT 700 may be determined in any suitable way. For example, engineers and/or technicians may program power value LUT 700 based on pre-characterization of the power consumed by fans 330 at different speeds.

In other examples, power value LUT 700 may store a plurality of coefficients defining a correlation curve that similarly associates a plurality of fan speed values with corresponding power values. Accordingly, power value determiner 420 may determine power value 422 by looking up the coefficients in the preprogrammed LUT and determining power value 422 according to the power value to which fan speed value 412 corresponds on the correlation curve defined by the coefficients. In other embodiments, power value determiner 420 may receive any inputs and generate power value 422 by various combinations of the embodiments described and/or by other methodologies recognized by persons of skill in the art.

Referring back to FIG. 4, fan speed determiner 410 may also provide fan speed value 412 to fan driver 430, which may generate PWM fan speed 432 based on fan speed value 412 and output PWM fan speed 432 to fans 330. For example, PWM fan speed 432 may direct fans 330 to operate at a speed based upon an operating temperature of components of information handling system 100 being cooled, an ambient temperature measured within information handling system 100, fan speed value 412, and/or other parameters that suit a particular embodiment. In some examples, PWM fan speed 432 may facilitate enforcement of fan speed value 412 by limiting fans 330 to run approximately at fan speed value 412 or below.

Fan driver 430 may generate and communicate PWM fan speed 432 in any suitable way. For example, fan driver 430 may generate PWM fan speed 432 to be a digital PWM signal having a duty cycle indicative of a percentage of total fan capacity that may be used (e.g., 40%) and may communicate the signal using an analog or digital waveform to fans 330 and/or to other components associated with information handling system 100. Thus, if fan speed value 412 indicates that fans 330 may be limited to run at no more than 40% of their total capacity, fan driver 430 may ensure that PWM fan speed 432 never exceeds a PWM duty cycle of 40%. However, in this example, PWM fan speed 432 may have a duty cycle less than 40% based on other factors such as a current temperature of information handling system 100 and the components being cooled therein. In other examples, fans 330 may be controlled by other methodologies known to persons of ordinary skill in the art rather than with pulse width modulation.

Figure 8:
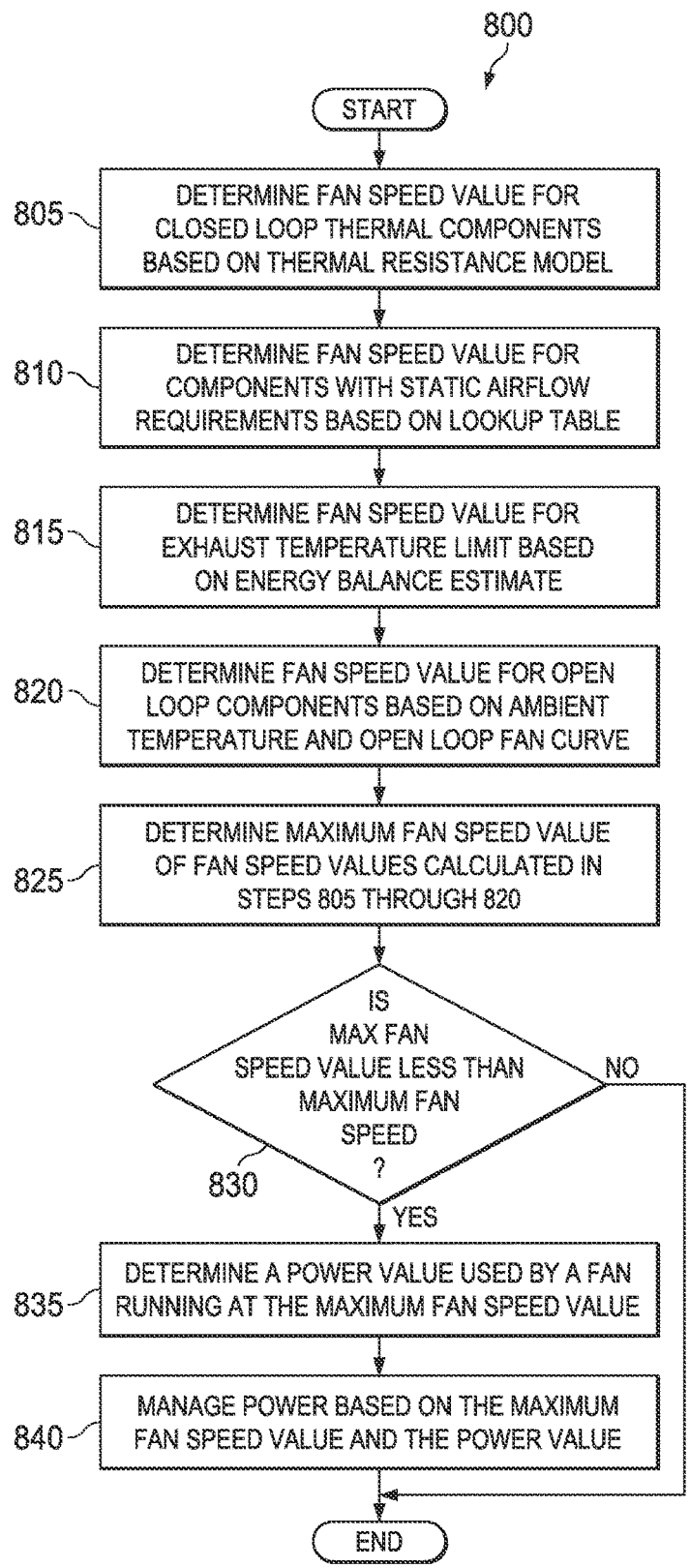
FIG. 8 is a flowchart depicting selected elements of an embodiment of a method for determining fan speed and power values within an information handling system for improved power management.

FIG. 8 is a flowchart depicting selected elements of an embodiment of a method 800 for determining fan speed within an information handling system for improved power management. Method 800 may be performed by any suitable apparatus or system, such as baseboard management control subsystem 300 running power control module 310 and thermal control module 320 (see FIG. 3). It is noted that certain operations described in method 800 may be optional or may be rearranged in different embodiments.

In the example of FIG. 8, fan speed determiner 410 may combine several parameters discussed above in relation to FIGS. 4-7 and/or other parameters in a hierarchical fashion to determine a fan speed value and a corresponding power value and use the values to manage power within an information handling system. Specifically, method 800 may determine individual fan speed values for different types of components in different ways and then determine a maximum fan speed value (e.g., corresponding to fan speed value 412 discussed in FIGS. 4 through 7) based on a maximum of the individual fan speeds.

Method 800 may start at step 805 where method 800 determines an individual fan speed value for closed loop components (e.g., CPUs) within the system using a thermal resistance model. For example, method 800 may determine the individual fan speed based on the thermal resistance model discussed in relation to FIG. 6. Closed loop components may be associated with a feedback loop such that the components may be cooled directly based on the temperature of the components as determined by a temperature sensor associated with the components. For example, closed loop components may employ a temperature sensor (e.g., a thermocouple) that is communicatively coupled with a fan speed controller such as thermal control module 320, described above in relation to FIGS. 3 through 7. When the temperature sensor indicates that the closed loop components are above a particular temperature threshold, the closed loop fan speed controller may increase the fan speed of the fans. Thereafter, when the temperature sensor indicates that the closed loop components are below a particular temperature threshold, the closed loop fan speed controller may decrease the fan speed of the fans, for example, back to the original fan speed. Accordingly, the closed loop fan speed controller may not employ static fan speed set points and/or other values developed by characterization and stored in LUTs. Method 800 may then move to step 810.

At step 810, method 800 may determine an individual fan speed value for components having static airflow requirements (e.g., PCI cards) based on a LUT or a curve. For example, method 800 may look up fan speeds correlated to volumetric airflow values in a LUT. For example, the volumetric airflow values in the LUT may be developed during system characterization with an airflow sensor as described above in relation to FIG. 4. In the same or other examples, method 800 may look up fan speeds that correlate to particular airflow velocity values required by the components. In the same or other examples, method 800 may determine fan speed based on volumetric airflow and/or airflow velocity correlated in a curve rather than in a LUT. Method 800 may then move to step 815.

At step 815, method 800 may determine an individual fan speed value for system exhaust temperature requirements based on energy balance estimates. For example, the exhaust air coming out of the information handling system may be constrained by system specifications or customer-defined requirements to be lower than a threshold temperature. Accordingly, an individual fan speed value corresponding to the maximum system exhaust temperature may be determined. Method 800 may then move to step 820.

At step 820, method 800 may determine an individual fan speed value for open loop components (e.g., hard disk drives) based on the system ambient temperature and an open loop fan curve. In contrast to closed loop components discussed above in relation to step 805, open loop components may not employ a temperature sensor to monitor the temperature of the components and relay it to a fan controller. Rather, a fan controller (e.g., within thermal control module 320) may drive fans to cool the open loop components according to static fan speed set points developed during system characterization, such as by looking up the set points in a LUT or determining them from a curve. Method 800 may then move to step 825.

At step 825, method 800 may determine a maximum fan speed value from the individual fan speed values calculated in steps 805, 810, 815, and 820. Using hierarchical logic to select the maximum fan speed value in this way, method 800 may determine the maximum fan speed value associated with cooling the particular hardware configuration of the information handling system. For example, the maximum fan speed value may correspond to fan speed value 220, described in relation to FIG. 2, and/or to fan speed value 412, described in relation to FIG. 4. Specifically, the maximum fan speed value may be suitable to cool the hardware configuration while being less than a maximum fan speed for cooling a fully-loaded hardware configuration when the hardware configuration lacks one or more components of the fully-loaded hardware configuration. Accordingly, fans running at or below the fan speed value may suitably cool the hardware configuration that the fan speed value is determined for, even if fans running at the fan speed value would not be able to suitably cool a fully-loaded hardware configuration. In some embodiments, determining the fan speed value may be performed in accordance with the examples described above in relation to FIGS. 2 through 6. Method 800 may then move to step 830.

At step 830, method 800 may determine if the maximum fan speed value determined at step 825 is less than a maximum fan speed. For example, the maximum fan speed may be the full speed at which the fans may run (e.g., a PWM percentage of 100%) or may be the fan speed determined to be used for a fully-loaded hardware configuration running at full capacity. The maximum fan speed is further described in reference to maximum fan speed 222 in FIG. 2. If the determined fan speed value is the same or greater than the maximum fan speed, method 800 may end because there may be no power margin to be reallocated. For example, if the hardware configuration of the information handling system is a fully-loaded hardware configuration, there may be no power management task to perform based on the determined fan speed value (e.g., there may be no power margin to reallocate). Conversely, if the fan speed value is less than the maximum fan speed, method 800 may move to step 835.

At step 835, method 800 may determine a power value used by a fan running at the fan speed value determined at step 825. As described in relation to FIG. 2, the power value associated with running the fan at the fan speed value may be less than a maximum power for operating the fan at full capacity to cool a fully-loaded hardware configuration (see maximum power 212 in FIG. 2). Thus, a power margin between the maximum power and the power value determined in step 835 may be freed up for potential reallocation within the information handling system. The power value may be determined using a fan speed value (e.g., the fan speed value determined at step 825) and/or by one or more LUTs providing values correlating fan speed values to power values or providing coefficients of a correlation curve correlating fan speed values to power values. Method 800 may then move to step 840.

At step 840, method 800 may manage power usage of the information handling system based on the fan speed value determined at step 825 and the power value determined at step 835. For example, method 800 may manage the power usage by limiting the one or more fans cooling the information handling system to ensure that they do not exceed the fan speed value. The one or more fans cooling the information handling system may be limited in any suitable way. For example, as described above in relation to FIG. 4, power supplied to the fans may be limited by a thermal control module. Additionally, managing the power usage may include determining a power margin that may be reallocated to other parts of the information handling system. For example, the power that would be used to power a fully-loaded hardware configuration but is not necessary for cooling the specific hardware configuration of the information handling system may be freed up for reallocation elsewhere in the information handling system. The power margin associated with the power value may be determined and/or reallocated in any suitable way, as described in examples given above in relation to FIGS. 2 and 4. After managing power usage based on the fan speed value and the power value, method 800 may end.

A baseboard management control subsystem may determine a fan speed value associated with a fan speed used to cool a particular hardware configuration of an information handling system. The baseboard management control subsystem may further determine a power value associated with a power consumed by a fan running at the determined fan speed value. The baseboard management system may manage power within the information handling system based on the determined fan speed value and the determined power value.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method for managing power in an information handling system, comprising:
   measuring, by a baseboard management control subsystem using an airflow sensor, an airflow associated with a fan used to cool hardware of the information handling system;
   determining, by the baseboard management control subsystem, a temperature of exhaust air exiting the information handling system based on exhaust temperature requirements;
   determining, by the baseboard management control subsystem, a fan speed value associated with the fan based on the measured airflow used to cool the hardware of the information handling system, the determined temperature of the exhaust air, and a thermal resistance model that associates a calculated thermal resistance value to the fan speed value;
   determining, by the baseboard management control subsystem, an amount of power, as a power value, consumed by a fan running at the determined fan speed value; and
   managing power within the information handling system by the baseboard management control subsystem based on the determined fan speed value and the determined power value by:
     limiting a speed of the fan to reduce power consumed by the fan by an amount of power; and
     reallocating the amount of power to at least one other component of the information handling system.

2. The method of claim 1, wherein:
   the determined fan speed value is less than a maximum fan speed at which the fan may run; and
   the determined power value is less than a maximum power associated with cooling a fully-loaded hardware configuration of the information handling system.

3. The method of claim 2, wherein managing power within the information handling system includes:
   limiting the fan speed of the fan to be less than the determined fan speed value;
   determining a power margin as a difference between the maximum power and the determined power value; and
   reallocating the power margin within the information handling system.

4. The method of claim 1, wherein determining the fan speed value is further based on:
   inventory information associated with a set of components included in a hardware configuration of the information handling system; and
   a power parameter associated with power consumed by the hardware configuration, the power parameter based on a pre-characterization of the set of components.

5. The method of claim 1, wherein determining the fan speed value includes:
   detecting the fan speed of the fan in response to hardware configuration of the information handling system processing a simulated workload in a controlled environment.

6. The method of claim 1, wherein determining the fan speed value is further based on a maximum ambient temperature parameter associated with the information handling system.

7. The method of claim 1, wherein determining the amount of power, as the power value, includes using a preprogrammed lookup table (LUT) storing at least one of:
   a plurality of fan speed values associated within the LUT to corresponding power values; and
   a plurality of coefficients defining a correlation curve, the correlation curve associating the plurality of fan speed values with the corresponding power values.

8. An article of manufacture, comprising:
   a non-transitory machine-readable memory media; and
   instructions on the non-transitory machine-readable memory media, when read by a processor, are configured to cause the processor to:
     measure, using an airflow sensor, an airflow associated with a fan used to cool hardware of an information handling system;
     determine a temperature of exhaust air exiting the information handling system based on exhaust temperature requirements;
     determine a fan speed value associated with the fan based on the measured airflow used to cool the hardware of the information handling system, the determined temperature of the exhaust air, and a thermal resistance model that associates a calculated thermal resistance value to the fan speed;

determine an amount of power, as a power value, a power consumed by a fan running at the determined fan speed value; and manage power within the information handling system based on the determined fan speed value and the determined power value, wherein, to manage power within the information handling system, the instructions further cause the processor to:

limit a speed of the fan to reduce power consumed by the fan by an amount of power; and reallocate the amount of power to at least one other component of the information handling system.

9. The article of claim 8, wherein:

the determined fan speed value is less than a maximum fan speed at which the fan may run; and the determined power value is less than a maximum power associated with cooling a fully-loaded hardware configuration of the information handling system.

10. The article of claim 9, wherein, to manage power within the information handling system, the instructions further cause the processor to:

limit the fan speed of the fan to be less than the determined fan speed value;

determine a power margin as a difference between the maximum power and the determined power value; and reallocate the power margin within the information handling system.

11. The article of claim 8, wherein, to determine the fan speed value, the instructions further cause the processor to determine the fan speed value further based on:

inventory information associated with a set of components included in a hardware configuration of the information handling system; and a power parameter associated with power consumed by the hardware configuration, the power parameter based on a pre-characterization of the set of components.

12. The article of claim 8, wherein, to determine the fans speed value, the instructions further cause the processor to:

detect the fan speed of the fan in response to a hardware configuration of the information handling system processing a simulated workload in a controlled environment.

13. The article of claim 8, wherein, to determine the fan speed value, the instructions further cause the processor to determine the fan speed value further based on a maximum ambient temperature parameter associated with the information handling system.

14. The article of claim 8, wherein, to determine the amount of power, as the power value, the instructions further cause the processor to determine the amount of power, as the power value, based on a preprogrammed lookup table (LUT) storing at least one of:

a plurality of fan speed values associated within the LUT to corresponding power values; and a plurality of coefficients defining a correlation curve, the correlation curve associating the plurality of fan speed values with the corresponding power values.

15. An information handling system, comprising:

a fan;
an airflow sensor;
a processor; and a machine-readable medium comprising instructions that, when read and executed by the processor, are configured to cause the processor to:

measure, using the airflow sensor, an airflow associated with the fan used to cool hardware of the information handling system;

determine a temperature of exhaust air exiting the information handling system based on exhaust temperature requirements;

determine a fan speed value associated with the fan based on the measured airflow used to cool the hardware of the information handling system, the determined temperature of the exhaust air, and a thermal resistance model that associates a calculated thermal resistance value to the fan speed;

determine an amount of power, as a power value, a power consumed by a fan running at the determined fan speed value; and manage power within the information handling system based on the determined fan speed value and the determined power value, wherein to manage power within the information handling system, the instructions further cause the processor to:

limit a speed of the fan to reduce power consumed by the fan by an amount of power; and reallocate the amount of power to at least one other component of the information handling system.

16. The information handling system of claim 15, wherein:

the determined fan speed value is less than a maximum fan speed at which the fan may run; and the determined power value is less than a maximum power associated with cooling a fully-loaded hardware configuration of the information handling system.

17. The information handling system of claim 16, wherein, to manage power within the information handling system, the instructions further cause the processor to:

limit the fan speed of the fan to be less than the determined fan speed value;

determine a power margin as a difference between the maximum power and the determined power value; and reallocate the power margin within the information handling system.

18. The information handling system of claim 15, wherein, to determine the fan speed value, the instructions further cause the processor to determine the fan speed value further based on:

inventory information associated with a set of components included in a hardware configuration of the information handling system; and a power parameter associated with power consumed by the hardware configuration, the power parameter based on a pre-characterization of the set of components.

19. The information handling system of claim 15, wherein, to determine the fan speed value, the instructions further cause the processor to:

detect the fan speed of the fan in response to a hardware configuration of the information handling system processing a simulated workload in a controlled environment.

20. The information handling system of claim 15, wherein, to determine the amount of power, as the power value, the instructions further cause the processor to determine the amount of power, as the power value, based on a preprogrammed lookup table (LUT) storing at least one of:

a plurality of fan speed values associated within the LUT to corresponding power values; and a plurality of coefficients defining a correlation curve, the correlation curve associating the plurality of fan speed values with the corresponding power values.

\* \* \* \* \*